US 6,749,505 B1

(12) United States Patent
Kunzle et al.

(10) Patent No.: US 6,749,505 B1
(45) Date of Patent: Jun. 15, 2004

(54) SYSTEMS AND METHODS FOR ALTERING GAME INFORMATION INDICATED TO A PLAYER

(75) Inventors: Adrian E. Kunzle, Wilmington, DE (US); V. Maximillian Garcia, New Haven, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/714,558

(22) Filed: Nov. 16, 2000

(51) Int. Cl.[7] ................................................ A63F 13/00
(52) U.S. Cl. .................................... 463/30; 463/23
(58) Field of Search .............................. 463/2–5, 7, 23, 463/30–35, 40–42; 434/247–252; 473/131, 409, 151–156

(56) References Cited

U.S. PATENT DOCUMENTS 5,779,549 A * 7/1998 Walker et al. ............... 463/42

OTHER PUBLICATIONS

Instruction Manual, "Links 386 CD Players Manual." Published by Access Software, Inc. 1995 pp. 1–87.*

* cited by examiner

Primary Examiner—Mark Sager
Assistant Examiner—Aaron Capron
(74) Attorney, Agent, or Firm—Magdalena M. Fincham

(57) ABSTRACT

Systems and methods are provided to facilitate game play. According to one embodiment, game information associated with a game to be played by a player is determined. For example, a putting green contour may be determined for a computer-based golf game. It is the arranged for altered game information to be indicated to the player and for the player to play the game in accordance with the game information, wherein the altered game information alters game play by an automated game playing device more than game play by a human player. For example, the contour of the putting green may be altered before being transmitted to a remote player device.

42 Claims, 18 Drawing Sheets

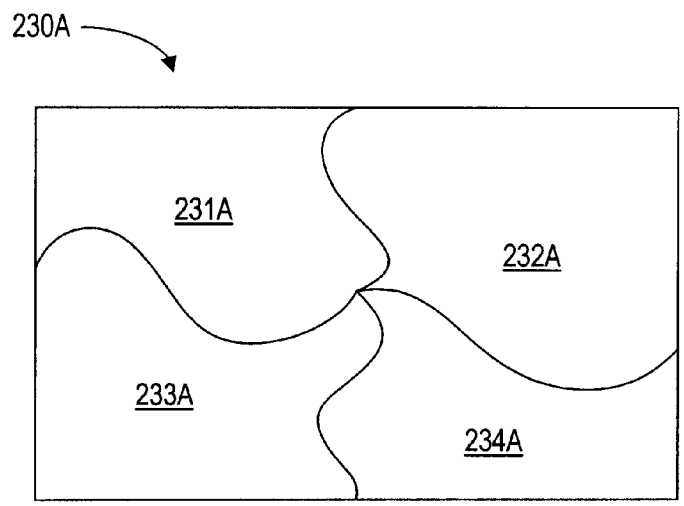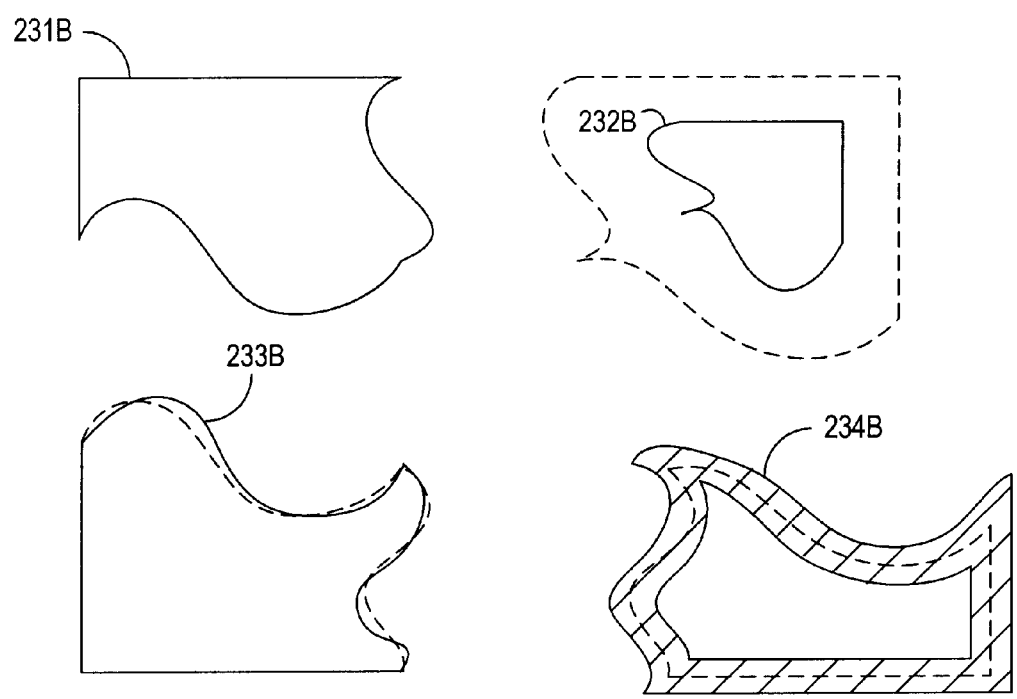
FIG. 2C

240A

```
WHEN DID "BABE" RUTH HIT 60 HOME RUNS?

A) 1926
            B) 1927
            C) 1928
            D) 1929
```

240B

```
THE "BAMBINO" HIT 60 HOME RUNS IN WHAT YEAR?

A) NINETEEN THIRTY
       B) NINETEEN TWENTY NINE
       C) NINETEEN TWENTY EIGHT
       D) NINETEEN TWENTY SEVEN
```

FIG. 2D

| PLAYER IDENTIFIER 502 | NAME 504 | CONTACT INFORMATION 506 | PAYMENT INFORMATION 508 | ACCOUNT BALANCE 510 |
|---|---|---|---|---|
| P1001 | JENNIFER JAMES | 32 GARDEN ROW BELLTOWN, USA | 1234-1244-2345-3456 (CREDIT CARD) | +$20 |
| P1002 | MICHAEL SMITH | TROLL@BRIDGE.COM | 3458-0239-0283-0293 (DEBIT CARD) | -$10 |
| P1003 | DAVID STONE | (333) 555-3333 | BGG@PAY.COM | 0 |
| P1004 | SUSAN PETERS | (478) 555-2890 | 0982-3245-7642-8933 (CREDIT CARD) | -$0.10 |
| P1005 | KEVIN WRIGHT | SDI93K@AOL.COM | BANK ACCOUNT NUMBER | +$1,000 |

| GAME IDENTIFIER 602 | PLAYER IDENTIFIER 604 | GAME TYPE 606 | GAME INFORMATION 608 | ALTERED GAME INFORMATION 610 | GAME RESULT 612 |
|---|---|---|---|---|---|
| G00-001 | P1001 | GOLF PUTTING | CONTOUR1; HOLE_LOCATION1 | ALTERED_CONTOUR1; ALTERED_HOLE_LOCATION1 | 3 FT FROM HOLE |
| G00-002 | P1001 | GOLF PUTTING | CONTOUR2; HOLE_LOCATION2 | ALTERED_CONTOUR2; ALTERED_HOLE_LOCATION2 | HOLE-IN-ONE |
| G00-003 | P1005 | BASKETBALL | HOOP_DISTANCE = 32.2 FT | HOOP_DISTANCE = 32.3 FT | $5 |
| G00-004 | P1002 | NAME THIS SONG | SONG.MP3 | ALTERED_SONG.MP3 | CORRECT |
| G00-005 | P1001 | TRIVIA | WHEN DID "BABE" RUTH HIT 60 HOME RUNS? | THE "BAMBINO" HIT 60 HOME RUNS IN WHAT YEAR? | $0 |

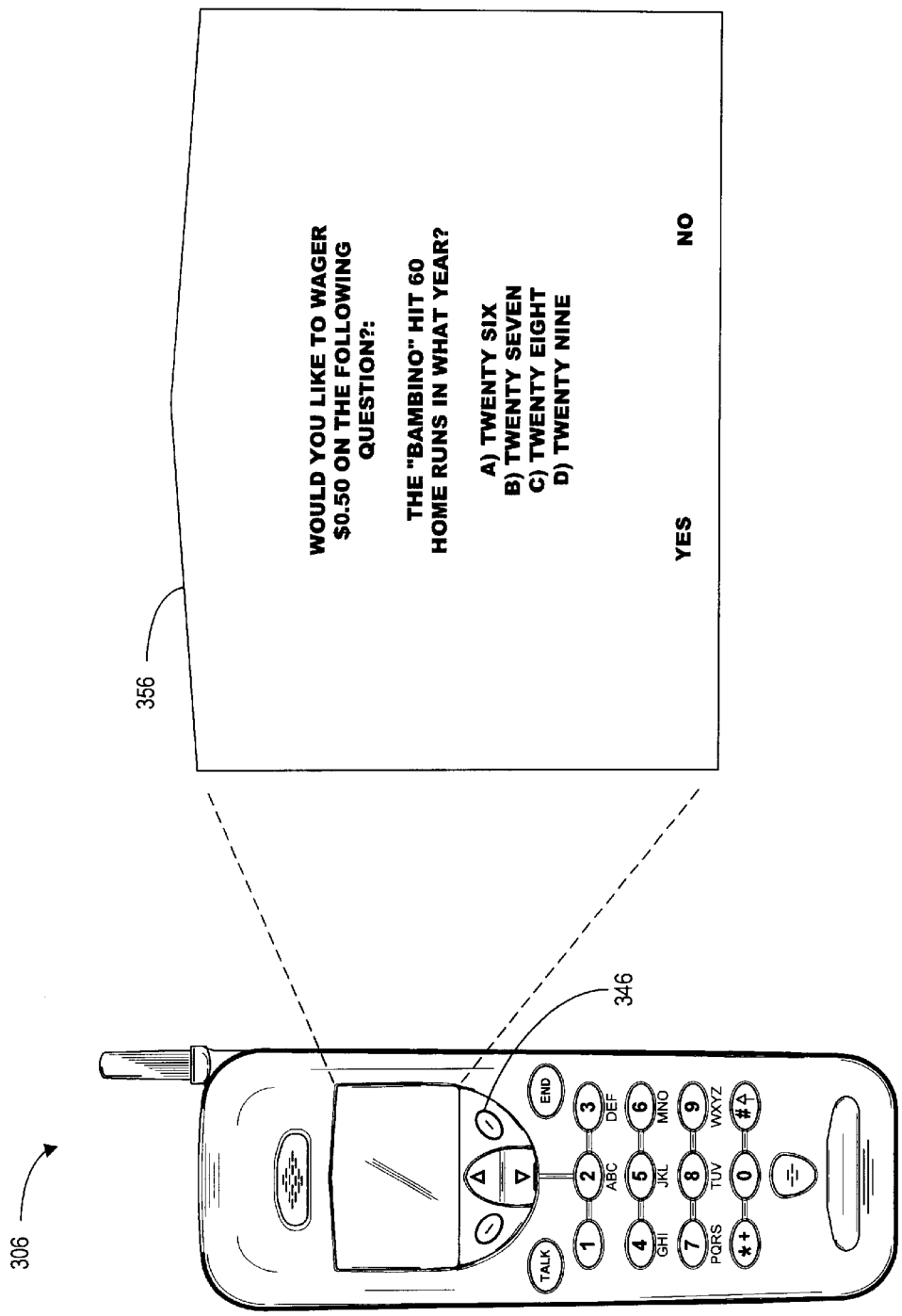

SYSTEMS AND METHODS FOR ALTERING GAME INFORMATION INDICATED TO A PLAYER

FIELD

The present invention relates to games. In particular, the present invention relates to systems and methods wherein game information is altered prior to being indicated to a player.

BACKGROUND

Many players enjoy playing games, such as games involving simulated physics. In a computer-based golf game, for example, a physics simulation (e.g., a computer program) calculates a trajectory of a simulated golf ball in accordance with a set of player input parameters, such as a golf club type, a golf club velocity, and/or an angular measurement associated with a swing of a golf club. Typically, a player will use a keyboard and/or a computer mouse to generate these player input parameters.

In addition to the player input parameters, the physics simulation calculates the trajectory of the simulated golf ball in accordance with game information, such as one or more game conditions (e.g., a fairway layout, a three-dimensional putting green terrain, or a wind condition). That is, a simulated golf ball landing on a fairway may "bounce" differently as compared to one that does not land on the fairway. Similarly, a wind direction and a wind velocity may alter the flight of the simulated golf ball, and a three-dimensional putting green terrain may alter how the simulated golf ball "rolls." Typically, these game conditions are indicated to the player (e.g., by graphically displaying a three-dimensional putting green terrain and wind direction along with a numerical representation of a wind velocity). The player may then generate player input parameters based on his or her perception of the game conditions.

Based on the trajectory calculated by the physics simulation, the simulated golf ball will come to rest at a destination. For example, the simulated golf ball may come to rest on a putting green or in a sand trap. In a typical computer-based golf game, a successful game result is to have the simulated golf ball come to rest within a simulated golf hole (e.g., after one or more simulated golf strokes).

There are many other types of games that players enjoy in addition to games involving simulated physics. For example, many players enjoy playing games in which a puzzle must be solved (e.g., a jigsaw-type puzzle). Many players also enjoy playing trivia games, including trivia games involving visual information (e.g., "who is the famous person shown in this picture?"), audio information (e.g., "what is the name of the song?"), or text information (e.g., "select the correct answer to the following question").

One way a player can play a game, such as one of the games described above, is via a remote player device. For example, a player may use his or her home computer to access a Web site at which a game can be played.

Some players, however, may try to use an automated game playing device to unfairly help them during game play. For example, a player may write a computer program to help him or her play a computer-based golf game (e.g., a "golf-bot" computer program). In this case, the computer program may analyze one or more game conditions displayed on a remote player device (e.g., on his or her home computer) and suggest or generate appropriate player input parameters.

In a game involving multiple players, such an automated game playing device may be a concern to other players, who might become discouraged if they are unable to compete with the automated game playing device. This will be particularly true if the players have provided payments in exchange for playing the game and/or are competing for a prize.

In addition to being a concern to other players, such an automated game playing device may be a concern to a game provider. Consider, for example, a game provider that promises to pay one thousand dollars to every player who shoots a "hole-in-one" during a computer based golf game. In this case, an automated game playing device may result in the game provider paying out an unfairly large number of prizes.

SUMMARY OF THE INVENTION

To alleviate problems inherent in the prior art, the present invention introduces systems and methods wherein game information is altered prior to being indicated to a player.

According to one embodiment, game information associated with a game to be played by a player is determined. It is then arranged for altered game information to be indicated to the player, and for the player to play the game in accordance with the game information. The altered game information may, for example, alter game play by an automated game playing device more than game play by a human player.

Another embodiment is directed to a computer-implemented method of conducting a golf game associated with a golf simulation, the golf simulation being adapted to generate a game result based on a set of input parameters. It is arranged for a player to provide a payment in exchange for playing the golf game, and a golf game condition is established. An altered golf game condition is transmitted to a remote player device via a communication network, and one or more player input parameters are received from the remote player device via the communication network. A game result is then determined based on the received player input parameters, the golf game condition, and the golf simulation. An indication associated with the game result is transmitted to the remote player device via the communication network, and it is arranged for the player to receive a payment based on the game result.

According to another embodiment, game information is determined and altered. It is then arranged for the altered game information to be indicated to a player, wherein the altered game information alters game play by an automated game playing device more than game play by a human player.

According to another embodiment, a player input parameter is received from a player, and an altered player input parameter is determined. It is then arranged for the player to play a game based on the altered player input parameter, wherein the altered player input parameter alters game play by an automated game playing device more than game play by a human player.

According to another embodiment, a game condition is translated into a translated game condition, and it is arranged for the translated game condition to be provided to the player. It is then arranged for the player to play the game in accordance with the game condition, wherein the translated game condition alters game play by an automated game playing device more than game play by a human player.

According to another embodiment, a player receives an indication of an altered game condition and plays a game in accordance with a game condition, wherein the altered game condition alters game play by an automated game playing device more than game play by a human player.

One embodiment of the present invention comprises: means for determining game information associated with a game to be played by a player; means for arranging for altered game information to be indicated to the player; and means for arranging for the player to play the game in accordance with the game information, wherein the altered game information alters game play by an automated game playing device more than game play by a human player.

Another embodiment is directed to a computer-implemented method of conducting a golf game associated with a golf simulation, the golf simulation being adapted to generate a game result based on a set of input parameters. This embodiment comprises: means for establishing a golf game condition; means for arranging for the player to provide a payment in exchange for playing the golf game; means for transmitting an altered golf game condition to a remote player device via a communication network; means for receiving from the remote player device a set of player input parameters via the communication network; means for determining a game result based on the received player input parameters, the golf game condition, and the golf simulation, wherein the golf game is associated with hitting a simulated golf ball and the game result comprises the simulated golf ball reaching a destination; means for transmitting to the remote player device an indication associated with the game result via the communication network; and means for arranging for the player to receive a payment if the destination of the simulated golf ball is within a predetermined distance of a simulated golf hole.

With these and other advantages and features of the invention that will become hereinafter apparent, the nature of the invention may be more clearly understood by reference to the following detailed description of the invention, the appended claims, and the several drawings attached herein.

BRIEF DESCRIPTION OF THE DRAWINGS

FIGS. 2B through 2D illustrate game displays according to some embodiments of the present invention.

FIG. 5 is a tabular representation of a portion of a player database according to an embodiment of the present invention.

FIG. 6 is a tabular representation of a portion of a game database according to an embodiment of the present invention.

FIGS. 13A through 13C illustrate player devices displaying altered game information according to some embodiments of the present invention.

DETAILED DESCRIPTION

Embodiments of the present invention are directed to systems and methods wherein game information is altered prior to being indicated to a player. For example, the altered game information may alter game play by an automated game playing device more than game play by a human player. In this way, an unfair advantage that would otherwise result from the use of the automated game playing device may be reduced.

Game System Overview

Figure 1:
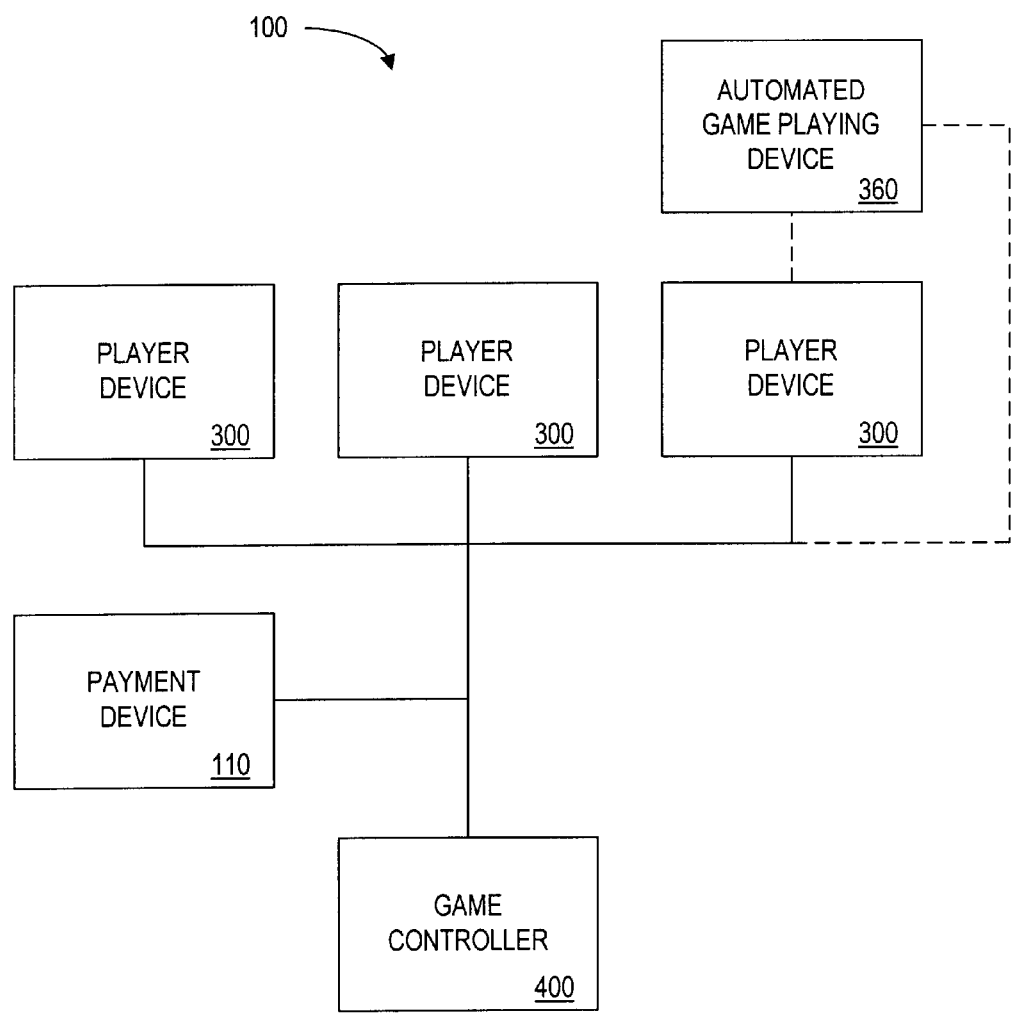
FIG. 1 is a block diagram overview of a game system according to an embodiment of the present invention.

Turning now in detail to the drawings, FIG. 1 is a block diagram overview of a game system 100 according to one embodiment of the present invention. The game system 100 includes a game controller 400 in communication with a number of player devices 300. As used herein, devices (such as the player devices 300 and the game controller 400) may communicate, for example, via a communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a cable television network, or an Internet Protocol (IP) network such as the Internet, an intranet or an extranet. Moreover, as used herein, communications include those enabled by wired or wireless technology. Note that although a single game controller 400 is shown in FIG. 1, any number of game controllers 400 may be included in the game system 100. Similarly, any number of the other devices described herein may be included in the game system 100 according to embodiments of the present invention.

In one embodiment of the present invention, a player device 300 communicates with a remote, Web-based game controller 400 (e.g., a server) via the Internet. Although some embodiments of the present invention are described with respect to information exchanged using a Web site, according to other embodiments information can instead be exchanged, for example, via: a telephone, an Interactive Voice Response Unit (IVRU), electronic mail, a WEBTV® interface, a cable network interface, and/or a wireless communication system.

The player device 300 and the game controller 400 may be any devices capable of performing various functions described herein. The player device 300 may be, for example: a Personal Computer (PC), a portable computing device such as a Personal Digital Assistant (PDA), a wired or wireless telephone, a one-way or two-way pager, a kiosk (e.g., a game kiosk located at an airport terminal), a game terminal, a SONY PLAY STATION® device, or any other appropriate storage and/or communication device.

Note that the devices shown in FIG. 1 need not be in constant communication. For example, the player device 300 may only communicate with the game controller 400 via the Internet when appropriate (e.g., when attached to a "docking" station or "cradle" coupled to the player's PC). The player device 300 may also communicate with the game controller 400 via an infrared device when near a game kiosk. Note also that a player device 300 and the game controller 400 may be incorporated in a single device (e.g., a game kiosk may act as both a player device 300 and the game controller 400).

According to an embodiment of the present invention, a player uses a player device 300 to communicate with the game controller 400. For example, a player may use his or her PC to access a Web site associated with the game controller 400 in order to play a game.

As is also shown in FIG. 1, a player may also attempt to use an automated game playing device 360 to help him or her during game play. The automated game playing device 360 may be, for example, a software program that is being executed on the player device 300. The automated game playing device 360 may also be a separate device, including a separate device that monitors information being received by, or output from, the player device 300. In general, the automated game playing device 360 may be any device capable of helping a player during game play.

For example, the automated game playing device 360 may analyze a graphical putting green contour displayed on the player device 300 and suggest or generate an appropriate set of player input parameters (e.g., the automated game playing device 360 may generate a "perfect" swing given one or more game conditions).

As another example, consider a game in which a portion of a song is played and a player is asked to provide the name of the song. In this case, the automated game playing device 360 may record audio information transmitted from the game controller 400 to the player device 300. The automated game playing device 360 may then compare the recorded audio information with a database of known songs (e.g., a database generated based on information recorded by the automated game playing device 360 during previous games) and unfairly indicate the name of the song to the player.

Note that the automated game playing device 360 does not need to be in direct communication with either the player device 300 or the game controller 400. Consider, for example, a player who plays a trivia game via a player device 300. In this case, the player may record game questions, potential game answers, and/or correct game answers by manually entering them into his or her laptop computer (i.e., into his or her automated game playing device 360). The player may then attempt to use information stored in the laptop computer to assist him or her during future games (e.g., when the same question is asked during a subsequent game).

Figure 2A:
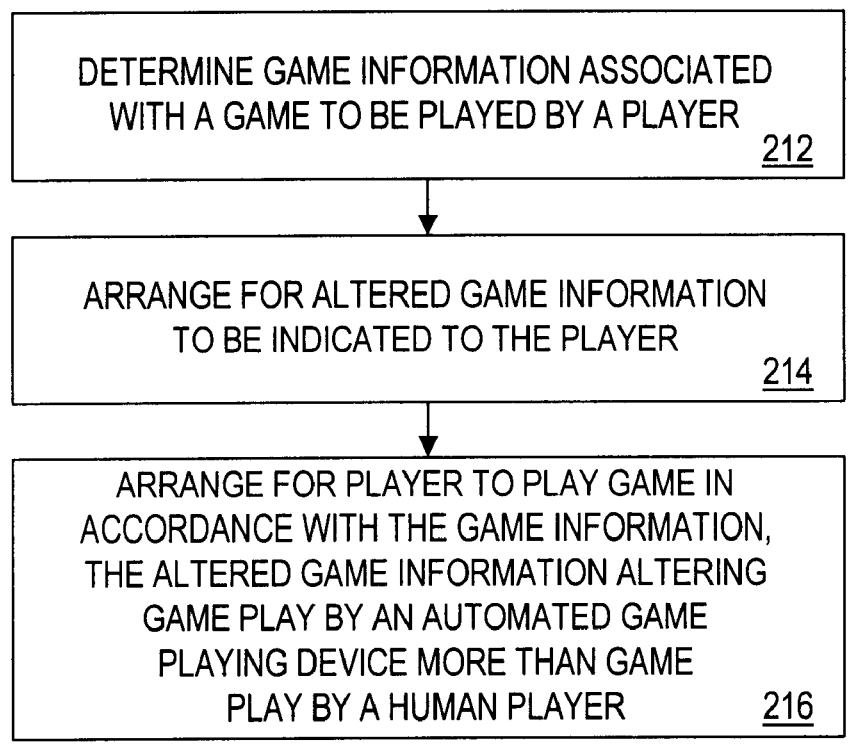
FIG. 2A is a flow chart of a method for facilitating game play according to an embodiment of the present invention.

FIG. 2A is a flow chart of a method for facilitating game play according to an embodiment of the present invention. The method shown in FIG. 2A may be performed by, for example, the game controller 400 and/or a player device 300.

At 212, game information associated with a game to be played by a player is determined. As used herein, "game information" can be any information that is associated with the play of a game. For example, game information may be used to determine (i.e., to at least partly determine) a game result. Examples of game information include visual information (e.g., a putting green contour or a picture of a famous person), audio information (e.g., a portion of a song or a spoken question), timing information (e.g., a speed at which something is changing), numerical information (e.g., a wind speed), and text information (e.g., a game question or a set of potential game answers).

According to one embodiment, game information is generated for a particular game to be played by a player. That is, different game information may be generated each time a player plays the game. According to another embodiment, game information is used for a number of games (e.g., the same game information may be used for all games or for games played by different players).

At 214, it is arranged for altered game information to be indicated to the player. For example, the game controller 400 may alter the game information and transmit the altered game information to a player device 300. In this way, an automated game playing device 360 may only be able to determine the altered game information (i.e., and not the original game information).

Figure 2B:
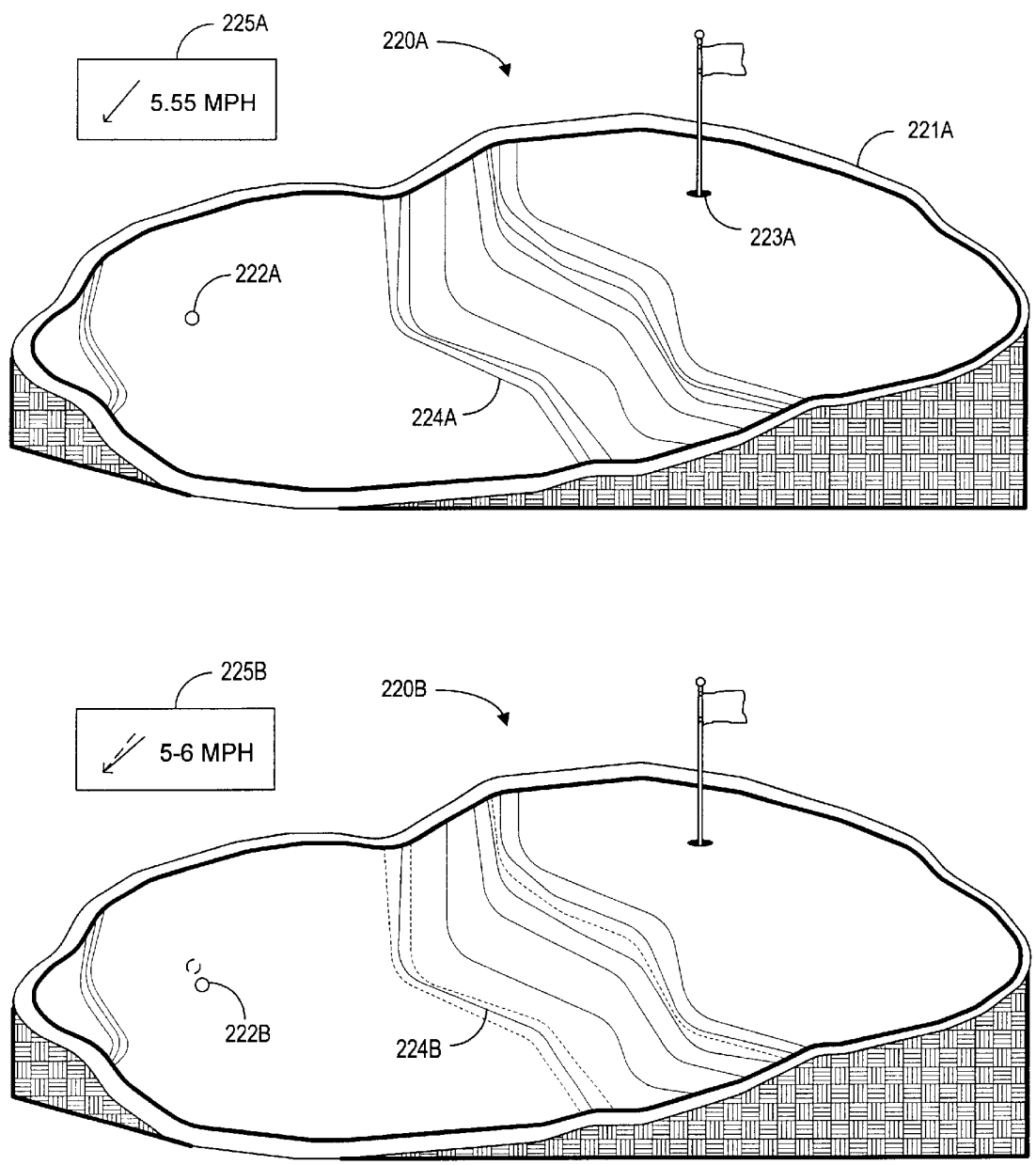

Consider, for example, the computer-based golf game display 220A and the altered golf game display 220B shown in FIG. 2B. The object of the golf game is for a player to provide a set of player input parameters (e.g., defining a golf swing) such that a simulated golf ball at a beginning location 222A will roll into a simulated golf hole 223A. In this case, the game information may include, for example, a wind direction and a wind velocity display 225A and a putting green 221A having a contour 224A.

According to an embodiment of the present invention, the game controller 400 transmits an altered representation of the game information to a player device 300. For example, the game controller 400 may shift the beginning location 222A of the simulated golf ball to an altered beginning location 222B. Similarly, the game controller 400 may adjust the contour 224A of the putting green 221A to generate an altered contour 224B. According to another embodiment, the game controller 400 may arrange for a visible or virtual display resolution associated with the player device 300 to be altered (e.g., by arranging for a display to have 640 by 480 pixels instead of 1024 by 768 pixels).

Moreover, the game controller 400 may transmit an altered wind direction and wind velocity display 225B to the player device 300. According to another embodiment, the wind velocity may instead be adjusted by being changed to a different number (e.g., "5.56 MPH"). Note that if altered game information is transmitted from the game controller 400 to the player device 300, it may be impossible for an automated game playing device 360 to determine the actual game information.

Referring again to FIG. 2A, at 216 it is arranged for the player to play the game in accordance with the game information (i.e., and not the altered game information). For example, one or more player input parameters may be transmitted from the player device 300 to the game controller 400. The game controller 400 may then use the received player input parameters and the game information to determine a game result.

According to an embodiment of the present invention, the altered game information alters game play by an automated game playing device 360 more than game play by a human player. Referring again to FIG. 2B, consider the differences between the contour 224A of the putting green 221A and the altered contour 224B that was actually displayed to the player. The altered contour 224B may have been generated, for example, by shifting portions of the contour 224A by a single pixel in a 1024 by 768 pixel image. As another example, the altered contour 224B may have been generated by removing some of the contour lines (shown as dashed lines in FIG. 2B) that were originally present in the contour 224A.

The difference between the contour 224A and the altered contour 224B may not be perceptible to a human player (e.g., a human player looking at both may be unable to distinguish between them). In this case, the game play of a human player would not be altered at all by the difference. However, an automated game playing device 360 may be able to analyze the altered contour 224B to the nearest pixel. Because the game controller 400 arranges for the game to played in accordance with the contour 224A (and not the altered contour 224B), a set of player input parameters generated by an automated game playing device 360 based on the altered contour 224B may be incorrect. In other words, the altered contour 224 may cause an automated game playing device 360 to perform less accurately in the game without altering how a human player would perform. Thus, the advantage that would have been enjoyed by a player using such an automated game playing device 360 is reduced. Note, however, that such an advantage may not be eliminated completely.

Similarly, the altered beginning location 222B and the altered wind direction and wind velocity display 225B may alter the play of an automated game playing device 360 without altering game play by a human player (e.g., a human player may be unable to account for a "5.55 MPH" wind velocity any more accurately than a "5–6 MPH" wind velocity due to the complexity of the calculations involved in determining a simulated trajectory for a golf ball).

Consider now FIG. 2C, which illustrates a puzzle game display 230A including four puzzle pieces 231A, 232A, 233A, 234A. According to this embodiment, a player must manipulate four altered puzzle pieces 231B, 232B, 233B, 234B to solve the puzzle. As shown in FIG. 2C, the size of the second puzzle piece 232A was reduced by the game controller 400 to generate the second altered puzzle piece 232B. The contour of the third puzzle 233A piece was slightly modified to generate the third altered puzzle piece 233B. The fourth altered puzzle piece 234B was generated by creating a "zone" or range containing the perimeter of the fourth puzzle piece 234A. Note that the display of the first puzzle piece 231A to the player was not altered.

Each of these changes may make it more difficult for an automated game playing device 360 to solve the puzzle without making it significantly more difficult for a human player to solve the puzzle. That is, a human player may be able to manipulate the four altered puzzle pieces 231B, 232B, 233B, 234B to solve the puzzle just as easily as he or she would have been able to manipulate the original four puzzle pieces 231A, 232A, 233A, 234B. Note that the changes may not make it impossible for an automated game playing device 360 to solve the puzzle. However, the complexity of the automated game playing device 360 and/or the time required for the automated game playing device 360 to solve the puzzle may be increased.

FIG. 2D illustrates text information 240A associated with a trivia game along with altered text information 240B that is indicated to a player. According to this embodiment, a player is provided with a game question and is asked to select a correct game answer from a set of potential game answers. The altered text information 240B may be generated by the game controller 400 using, for example, a database such as a thesaurus to translate "'Babe' Ruth" into "the 'Bambino.'" Note that the test information 240A may also be altered, for example, by re-arranging the syntax of the game question and/or by altering the set of potential game answers (including by re-arranging the set of potential game answers).

According to some embodiment of the present invention, the altered game information may in fact alter game play by a human player. For example, a player who knew that "Babe" Ruth hit sixty home runs in 1927 may not realize that "Babe" Ruth was also known as the "Bambino." However, the altered game information may still alter game play by an automated game playing device 360 more than game play by the human player. For example, an automated game playing device 360 that merely searches a database of previous questions looking for matching keywords may be completely unable to answer an altered game question.

Referring again to FIG. 1, according to one embodiment a payment device 110 may be used to arrange for a player to provide a payment in exchange for playing the game and/or to receive a payment if a determined game result has a predetermined relationship to a successful game result. For example, the game controller 400 may arrange for the player to receive $1,000 if he or she shoots a hole-in-one in a computer-based golf game. As another example, the game controller 400 may arrange for a player to purchase one or more game plays via the payment device 110 (e.g., via a credit card account, a debit card account, a banking account, or an electronic payment protocol).

Player Device

Figure 3:
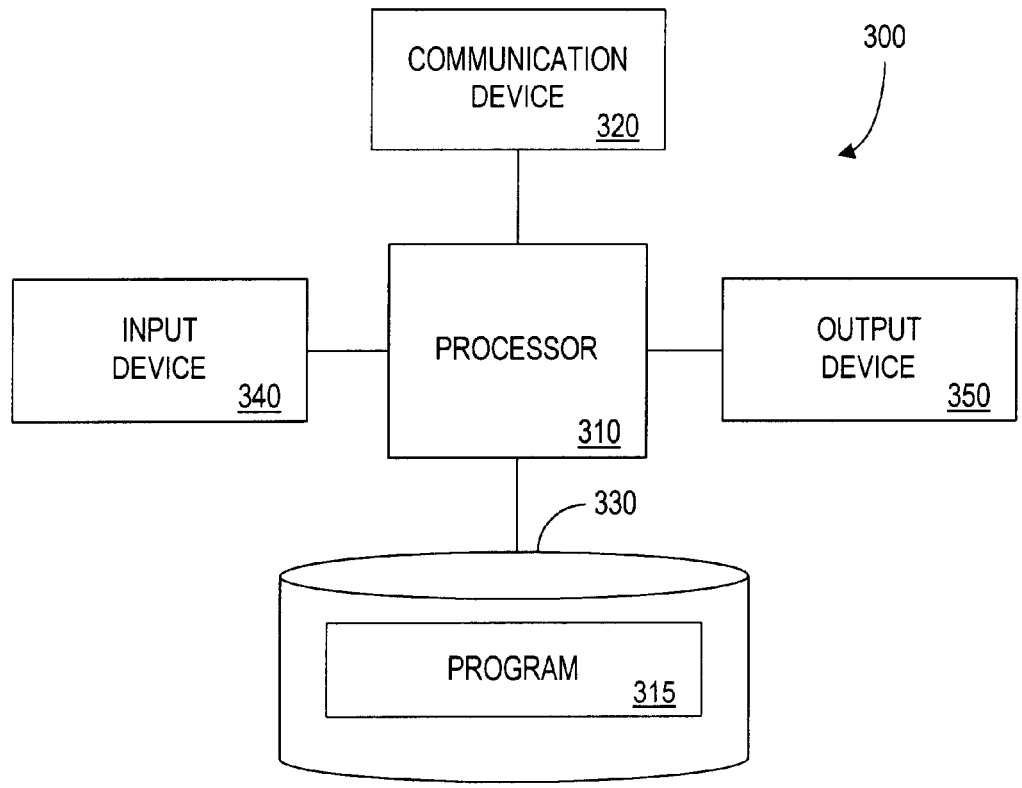
FIG. 3 is a block diagram of a player device according to an embodiment of the present invention.

FIG. 3 illustrates a player device 300 that is descriptive of the device shown in FIG. 1, according to an embodiment of the present invention. The player device 300 comprises a processor 310, such as one or more INTEL® Pentium® processors, coupled to a communication device 320 configured to communicate via a communication network (not shown in FIG. 3). The communication device 320 may be used to communicate, for example, with the game controller 400 and/or the payment device 110.

The processor 310 is also in communication with an input device 340. The input device 340 may comprise, for example, a keyboard, a mouse or other pointing device, a microphone, a knob or a switch (including an electronic representation of a knob or a switch), an infrared port, a docking station, and/or a touch screen. Such an input device 340 may be used, for example, by a player to play a game (e.g., by manipulating a pointer associated with a computer-based golf game).

The processor 310 is also in communication with an output device 350. The output device 340 may comprise, for example, a display (e.g., a computer monitor), a speaker, and/or a printer. The output device 350 may be used, for example, to provide altered game information to a player.

The processor 310 is also in communication with a storage device 330. The storage device 330 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 330 stores a program 315 for controlling the processor 310. The processor 310 performs instructions of the program 315, and thereby operates in accordance with the present invention. For example, the processor 310 may arrange for a player to play a game.

As used herein, information may be "received" by or "transmitted" to, for example: (i) the player device 300 from the game controller 400; or (ii) a software application or module within the player device 300 from another software application, module, or any other source.

Figure 13A:
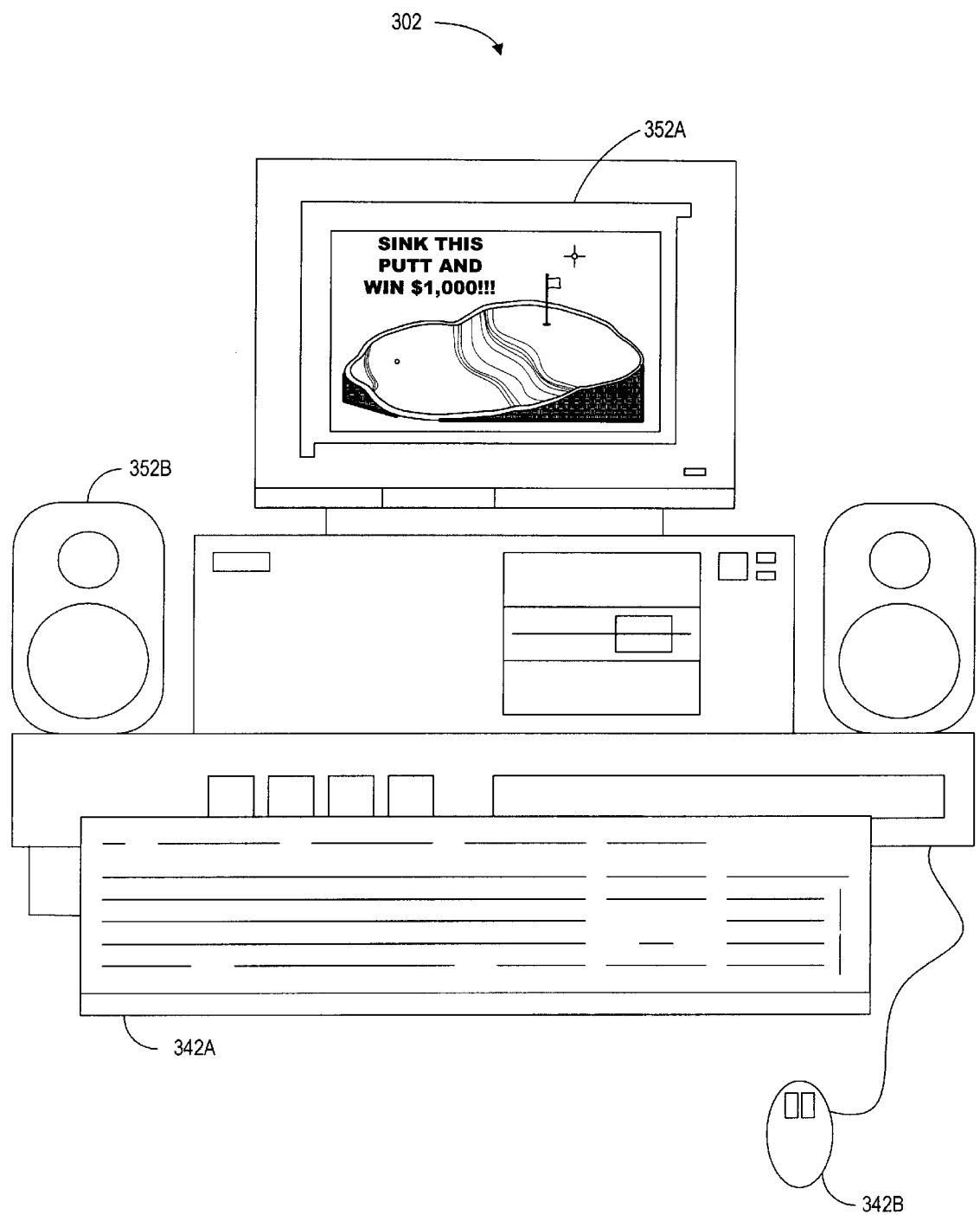

FIG. 13A illustrates a PC 302 displaying altered game information according to an embodiment of the present invention. The PC 302 includes a keyboard 342A and a mouse 342B which can be used by a player to play a game (e.g., by inputting player input parameters). The PC 302 also includes a computer display 352A and speakers 352B used to indicate altered game information to the player.

Figure 13B:
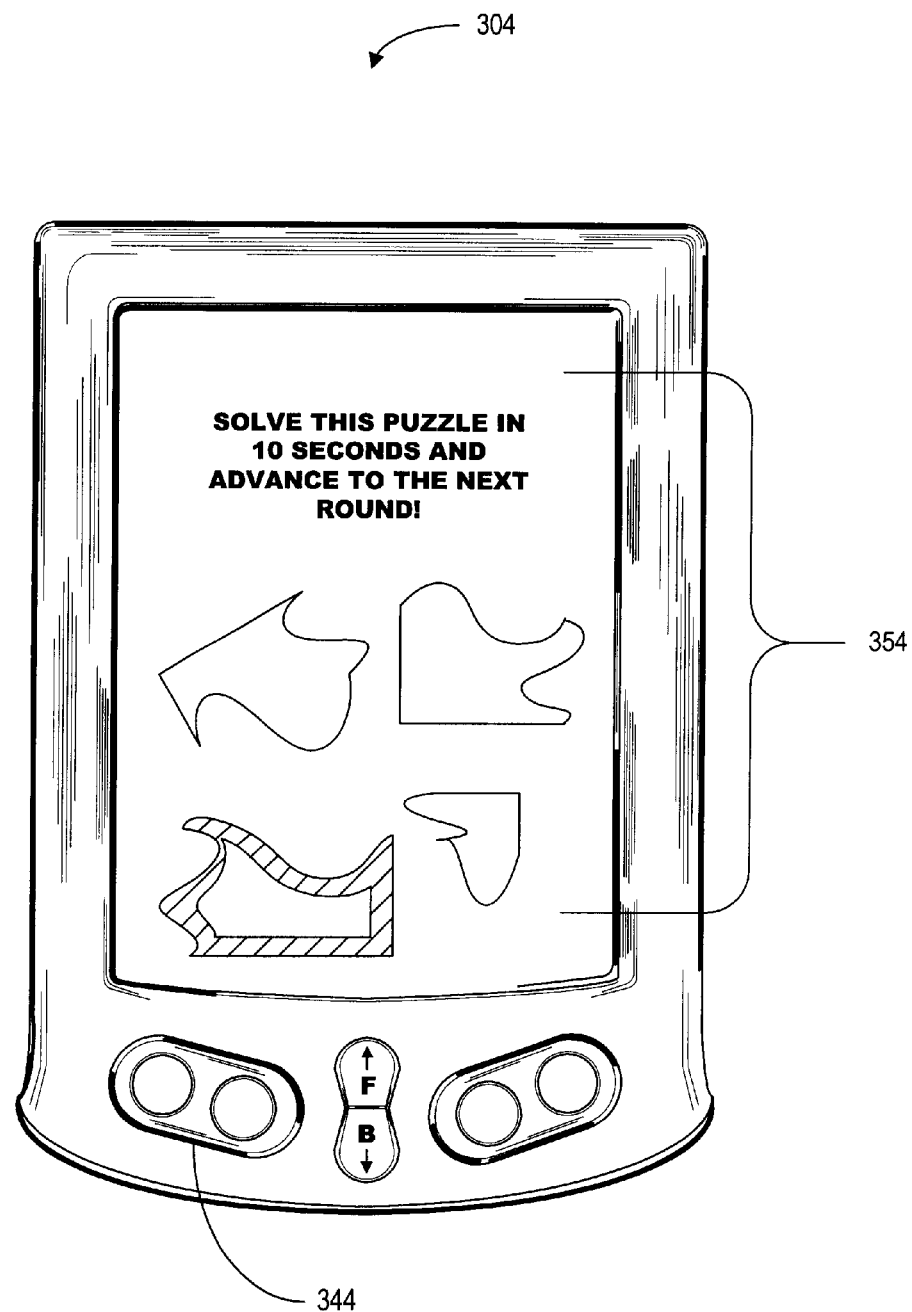

FIG. 13B illustrates a PDA 304 displaying altered game information according to another embodiment of the present invention. The PDA 304 includes an input device 344 and an output device 354 (e.g., a display screen) that may be used by a player to play a game. Similarly, FIG. 13C illustrates a wireless telephone 306 including an input device 346 and an output device 356 displaying altered game information.

Game Controller

Figure 4:
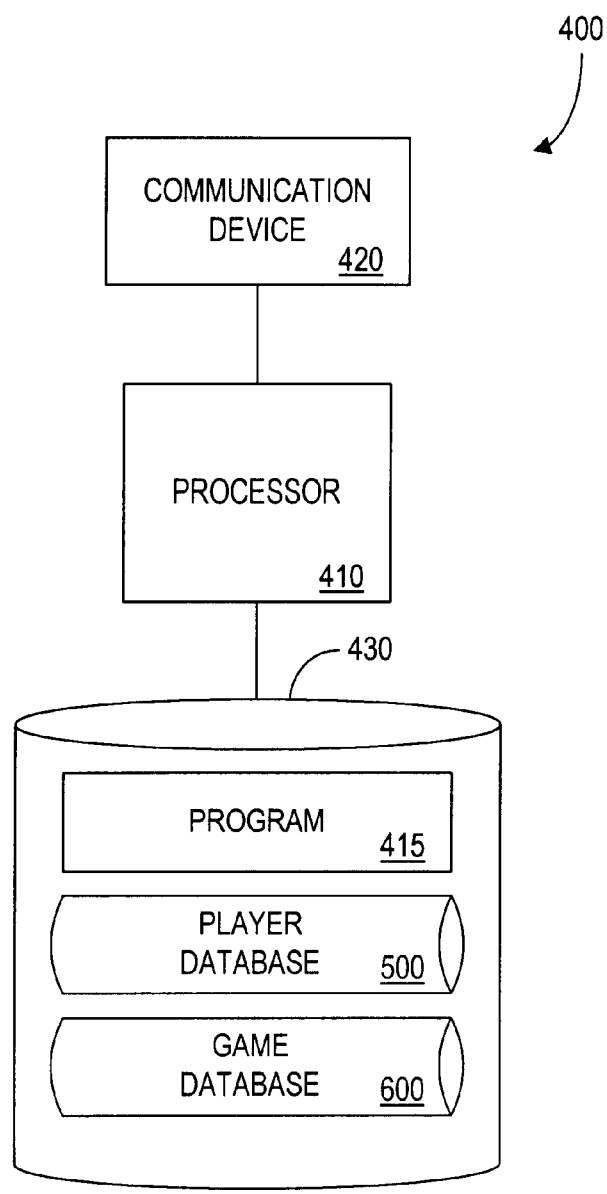
FIG. 4 is a block diagram of a game controller according to an embodiment of the present invention.

FIG. 4 illustrates a game controller 400 that is descriptive of the device shown in FIG. 2, according to an embodiment of the present invention. The game controller 400 comprises a processor 410, such as one or more INTEL® Pentium® processors, coupled to a communication device 420 configured to communicate via a communication network (not shown in FIG. 4). The communication device 420 may be used to communicate, for example, with one or more player devices 300 and/or the payment device 110.

The processor 410 is also in communication with a storage device 430. The storage device 430 may comprise any appropriate information storage device, including combinations of magnetic storage devices (e.g., magnetic tape and hard disk drives), optical storage devices, and/or semiconductor memory devices such as RAM devices and ROM devices.

The storage device 430 stores a program 415 for controlling the processor 410. The processor 410 performs instructions of the program 415, and thereby operates in accordance with the present invention. For example, the processor 410 may determine game information associated with a game to be played by a player. The processor 410 may also arrange for altered game information to be indicated to the player, wherein the altered game information alters game play by an automated game playing device more than game play by a human player. The processor 410 may also arrange for the player to play the game in accordance with the game information.

According to another embodiment, the processor 410 conducts a golf game associated with a golf simulation, the golf simulation being adapted to generate a game result based on a set of input parameters. According to this embodiment, the processor 410 arranges for a player to provide a payment in exchange for playing the golf game and establishes one or more golf game conditions (e.g., a contour, a wind direction, and a wind velocity). The processor 410 transmits one or more altered golf game conditions to a remote player device via a communication network and receives from the remote player device a set of player input parameters. Based on the player input parameters, the game conditions, and the golf simulation, the processor 410 determines a game result (e.g., the golf game may be associated with hitting a simulated golf ball and the game result may involve the simulated golf ball reaching a destination). The processor 410 may then transmit to the remote player device an indication associated with the game result and arrange for the player to receive a payment based on the game result.

The program 415 may be stored in a compressed, uncompiled and/or encrypted format. The program 415 may furthermore include other program elements, such as an operating system, a database management system, and/or device drivers used by the processor 410 to interface with peripheral devices.

As used herein, information may be "received" by or "transmitted" to, for example: (i) the game controller 400 from the player device 300; or (ii) a software application or module within the game controller 400 from another software application, module, or any other source.

As shown in FIG. 4, the storage device 430 also stores a player database 500 (described with respect to FIG. 5) and a game database 600 (described with respect to FIG. 6). Examples of databases that may be used in connection with the game system 100 will now be described in detail with respect to FIGS. 5 and 6. The illustrations and accompanying descriptions of the databases presented herein are exemplary, and any number of other database arrangements could be employed besides those suggested by the figures.

Player Database

Referring to FIG. 5, a table represents the player database 500 that may be stored at the game controller 400, according to an embodiment of the present invention. The table includes entries identifying players who may play games via the game system 100. The table also defines fields 502, 504, 506, 508, 510 for each of the entries. The fields specify: a player identifier 502, a name 504, contact information 506, payment information 508, and an account balance 510. The information in the player database 500 may be created and updated, for example, based on information received from player when he or she registers with the game controller 400. The information in the player database 500 may also be based on, for example, information generated as the player plays games via the game system 100.

The player identifier 502 may be, for example, an alphanumeric code associated with a player who has registered to use the game system 100. The player identifier 502 may be generated by, for example, the game controller 400 or the player (e.g., when the player provides a user name and password). The player database 500 also stores the name 504 and contact information 506 (e.g., a postal address, an electronic mail address, an IP address, or a telephone number) associated with each player.

The payment information 508 may comprise, for example, a credit card, debit card or bank account number (e.g., a checking account number) or digital payment protocol information. The account balance 510 may represent an amount that a player owes to a game provider or an amount that the game provider owes to the player. The payment information 508 and account balance 510 may be used, for example, by the game controller 400 to arrange for the player to provide or receive a payment.

Game Database

Referring to FIG. 6, a table represents the game database 600 that may be stored at the game controller 400, according to an embodiment of the present invention. According to another embodiment, all or some of the information in the game database 600 may instead be stored at a player device 300. The table includes entries identifying games that have been played via the game system 100. The table also defines fields 602, 604, 606, 608, 610, 612 for each of the entries. The fields specify: a game identifier 602, a player identifier 604, a game type 606, game information 608, altered game information 610, and a game result 612. The information in the game database 600 may be created and updated, for example, as players play games.

The game identifier 602 may be, for example, an alphanumeric code associated with a game that was played via the game system 100. The player identifier 604 indicates the player who played the game, and may be based on, or associated with, the player identifier 502 stored in the player database 500. The game type 606 represents the type of game that was played by the player (e.g., a golf putting game or a trivia game).

The game information 608 may represent, for example, one or more game conditions generated or used by the game controller 400. For example, the game information 608 may comprise visual information, audio information, timing information, numerical information, and/or text information. According to one embodiment of the present invention, the game controller 400 uses the game information stored in the game database 600 to determine a game result. For example, game information 608 associated with a putting green contour may be used to determine how a simulated golf ball will roll. The game information 608 may be associated with a particular game or a plurality of games.

The altered game information 610 may represent, for example, one or more game conditions that are indicated to a player. For example, game controller 400 may alter the game information 608 stored in the game database 600 to generate the altered game information 610. The altered game information 610 may then be transmitted to a remote player device 300. Because the altered game information 610 (and not the game information 608) is received by the remote player device 300, the game play of an automated game playing device 360 may be altered. Moreover, the altered game information 610 may alter game play by the automated game playing device 360 more than game play by a human player.

The game result 612 may be generated by the game controller 400 based on the game information 608 and may indicate, for example, a position of a simulated object and/or an amount that has been won by the player during the game. According to one embodiment, the game database 600 also stores one or more player input parameters (not shown in FIG. 6) based on information received from the player device 300 during play of the game. The game controller 400 may then generate the game result 612, for example, using a physics simulation, the game information 608, and the player input parameters. According to another embodiment of the present invention, the game database 600 stores information that enables the determination of the game information and/or the altered game information. For example, the game information may be stored along with information associated with a translation between the game information and the altered game information.

Methods that may be used in connection with the game system 100 according to some embodiments of the present invention will now be described in detail with respect to FIGS. 7 through 12.

Game System Methods

Figure 7:
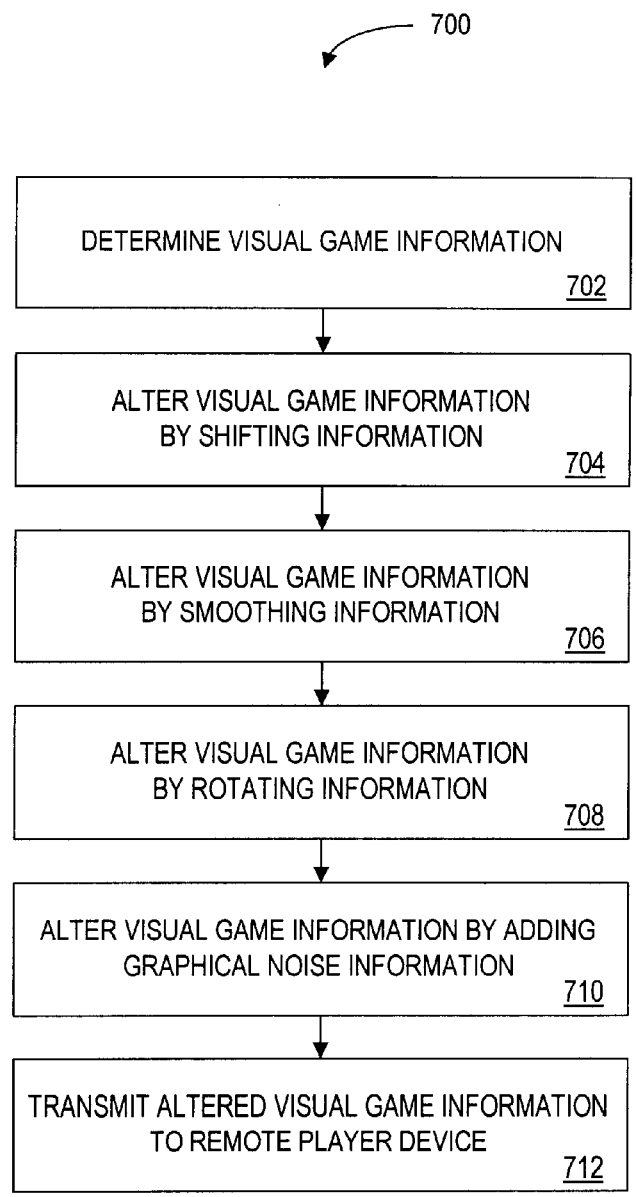
FIG. 7 is a flow chart of a method wherein visual game information is altered according to an embodiment of the present invention.

FIG. 7 is a flow chart of a method 700 that may be performed by the game controller 400 according to an embodiment of the present invention. The other flow charts discussed herein do not imply a fixed order to the steps, and embodiments of the present invention can be practiced in any order that is practicable. Moreover, the methods may be performed by any device described herein, including a player device 300.

The method associated with FIG. 7 is directed to a game in which visual information is provided to a player. One example of such a game is a computer-based golf game in which a player propels a simulated golf ball and attempts to have the simulated golf ball come to rest within a simulated golf hole. At 702, the visual game information is determined. The visual game information may be associated with, for example, a graphical representation of a putting green contour or a picture of a famous person. Moreover the visual game information may represent a static image or a changing image. Similarly, the visual game information may represent a two-dimensional image or a three-dimensional image.

At 704, the visual game information is altered by shifting information. For example, portions of the visual game information may be shifted by a predetermined number of pixels. At 706, the visual game information is altered by smoothing information. For example, a portion of a putting green contour may be smoothed or a picture of a famous person may be slightly blurred. At 708, the visual game information is altered by rotating information. For example, portions of the visual game information may be rotated by a predetermined number of degrees. At 710, the visual game information is altered by adding graphical noise information. For example, a picture of a famous person may be altered by adding random white pixels to the picture.

At 712 the altered visual game information is transmitted to a remote player device 300. A player may then play a game based on his or her perception of the altered visual information. Note that, according to one embodiment, the game controller 400 determines a game result based on the visual game information (i.e., and not the altered visual game information).

Each of the alterations to the visual game information may alter game play by an automated game playing device 360. For example, the effectiveness of an automated game playing device 360 that attempts to calculate a perfect golf shot based on a putting green contour may be reduced because portions of the contour have been smoothed. Similarly, an automated game playing device 360 may be unable to easily match a picture of a famous person that has been rotated by one degree with any of a number of graphical files stored in a database (e.g., including a file of the same famous person that has been rotated by two degrees). Moreover, the game play of the automated game playing device 360 may be altered more than game play by a human player.

Note that not all of the alterations shown in FIG. 7 need to be performed. Moreover, other alterations may be performed instead of, or in addition to, those shown in FIG. 7. For example, portions of the visual game information may be altered via a location adjustment, a size adjustment, a view adjustment (e.g., by altering the perspective from which visual information is viewed), a resolution adjustment, an averaging, a translation (e.g., from three-dimensional visual information to two-dimensional visual information), a color adjustment (e.g., by dithering information being displayed via the player device 300), a brightness adjustment, a texture adjustment, and/or a visual range (e.g., as illustrated by the fourth altered puzzle piece 234B in FIG. 2C). Consider a game symbol, such as a playing card, that is displayed to a player during a game. According to one embodiment, the symbol is altered and displayed to the player from one of a number of different perspectives (e.g., the symbol may be "tilted" away from the player five degrees and rotated clockwise ten degrees). In this way, a human player will still be able to easily recognize the symbol, but an automated game playing device will need to perform extensive calculations in order to do so.

Figure 8:
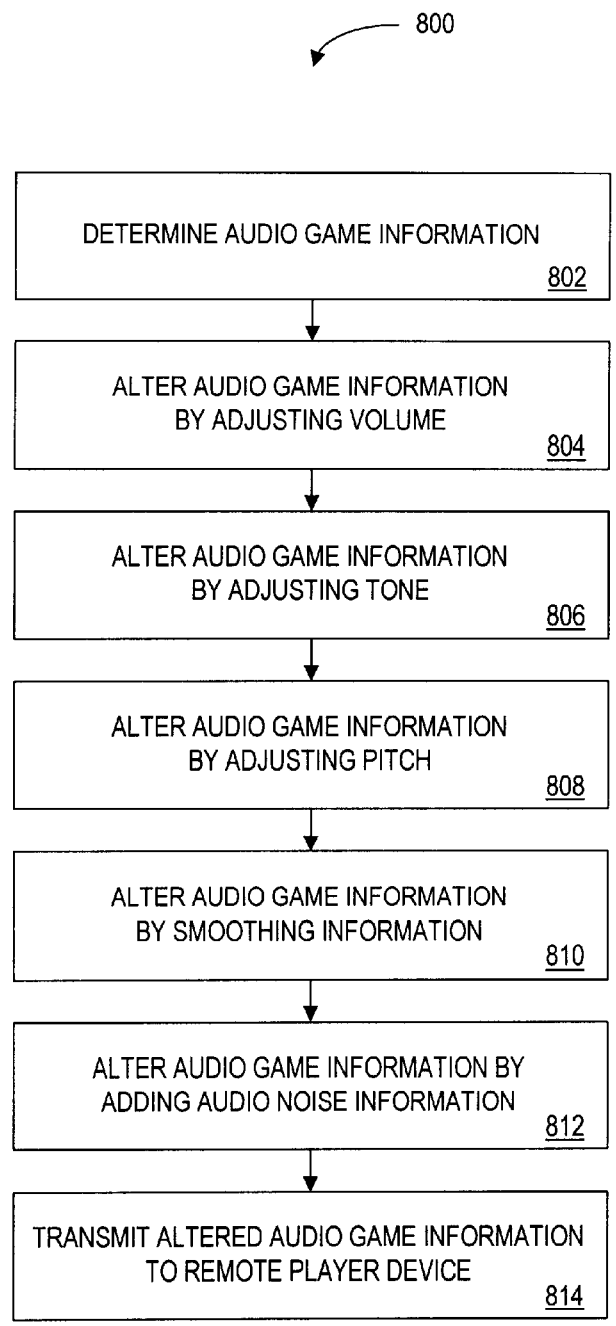
FIG. 8 is a flow chart of a method wherein audio game information is altered according to an embodiment of the present invention.

FIG. 8 is a flow chart of a method 800 wherein audio game information is altered according to an embodiment of the present invention. Such a method may be used, for example, to facilitate play of a game in which a player is required to provide the name of a song or to respond to audio cue. At 802, the audio game information is determined. The audio game information may represent, for example, a song, speech (e.g., a spoken trivia question), or a sound effect.

At 804, the audio game information is altered by adjusting the volume of the information (e.g., by increasing or decreasing the volume of the audio game information). The audio game information is altered by adjusting the tone of the information at 806 and the pitch of the information at 808. At 810, the audio game information is altered by smoothing the waveform associated with at least a portion of the information. At 812, the audio game information is altered by adding audio noise information (e.g., to simulate static noise).

The altered audio game information may then be transmitted to a remote player device 300 at 814. For example, an MP3 file may be transmitted to the remote player device 300. A player may then play a game based on his or her perception of the altered audio game information.

According to an embodiment of the present invention, each of the alterations to the audio game information may alter game play by an automated game playing device 360. Moreover, the game play of the automated game playing device 360 may be altered more than game play by a human player. Note that not all of the alterations shown in FIG. 8 need to be performed. Moreover, other alterations may be performed instead of, or in addition to, those shown in FIG. 8. For example, portions of the audio game information may be altered via a speed adjustment (e.g., by slowing down or speeding up the audio game information), an accent adjustment (e.g., in the case of a spoken game question), or an audio range.

Figure 9:
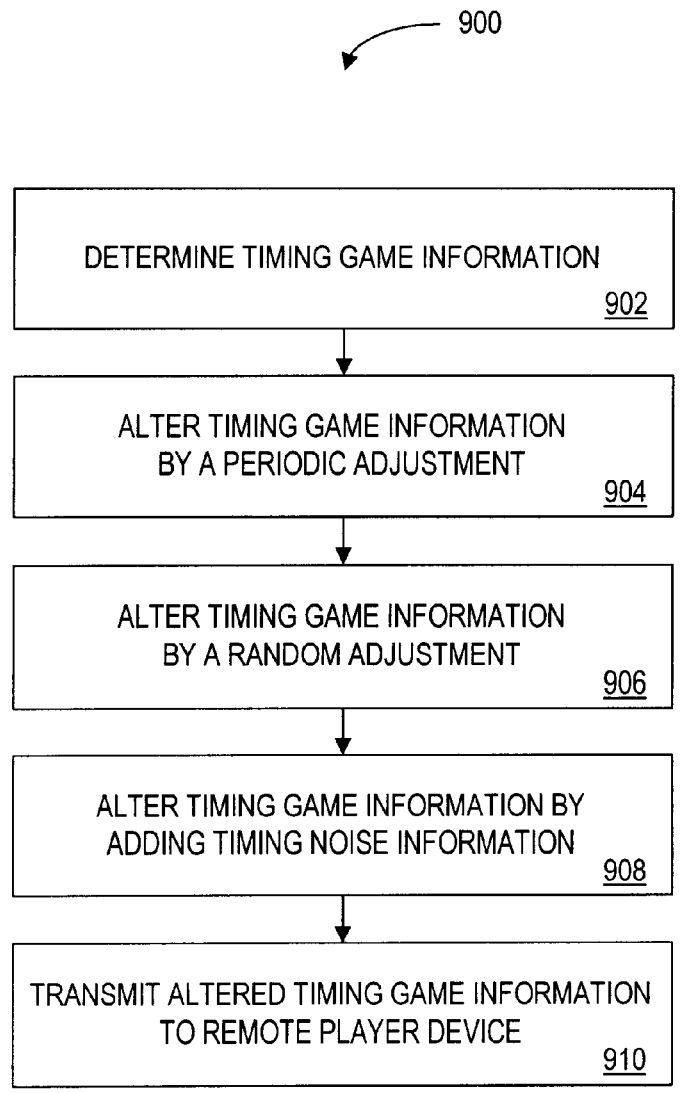
FIG. 9 is a flow chart of a method wherein timing game information is altered according to an embodiment of the present invention.

FIG. 9 is a flow chart of a method 900 wherein timing game information is altered according to an embodiment of the present invention. Such a method may be used, for example, to facilitate play of a game in which a player responds or reacts to the timing information. At 902, the timing game information is determined. The timing game information may represent, for example, an amount of time between two events (e.g., between two visual displays or audio cues).

At 904, the timing game information is altered by a periodic adjustment (e.g., an amount of time may be rounded to the nearest tenth of a second). At 906, the timing game information is altered by random information (e.g., an amount of time may be increased by between 0.01 and 0.05 seconds). At 908, the timing game information is altered by adding timing noise information.

The altered timing game information may then be transmitted to a remote player device at 910, and a player may then play a game based on his or her perception of the altered timing game information. According to an embodiment of the present invention, each of the alterations to the timing game information may alter game play by an automated game playing device 360. Moreover, the game play of the automated game playing device 360 may be altered more than game play by a human player. Note that not all of the alterations shown in FIG. 9 need to be performed. Moreover, other alterations may be performed instead of, or in addition to, those shown in FIG. 9. For example, portions of the time game information may be altered by translating the timing information into a range of times.

Figure 10:
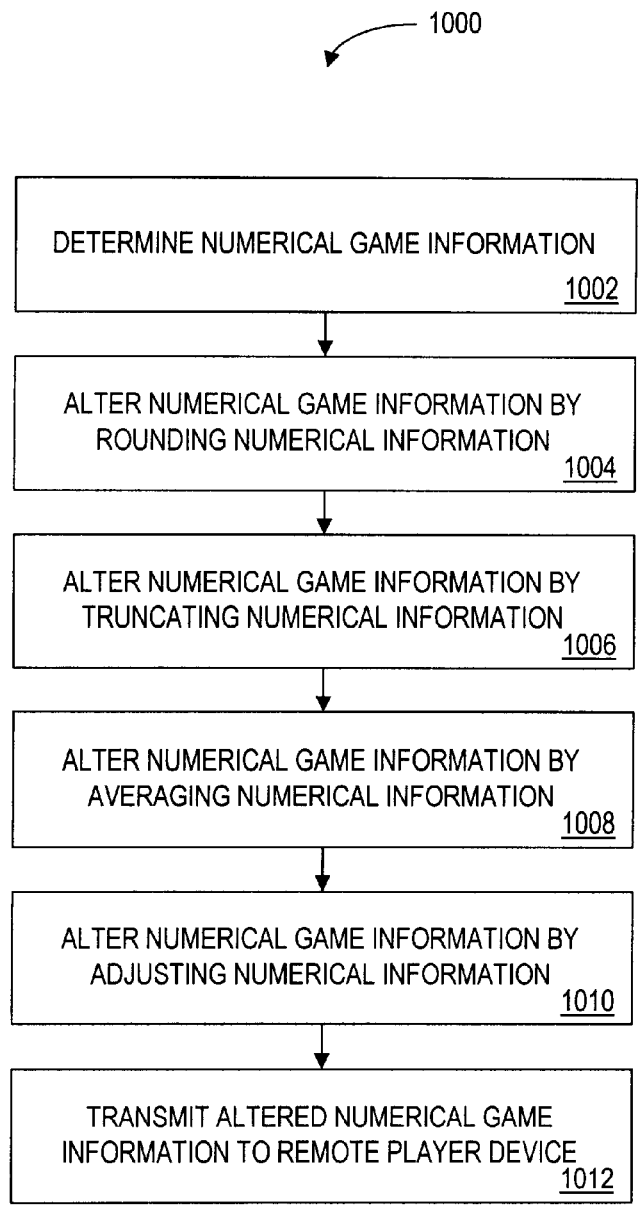
FIG. 10 is a flow chart of a method wherein numerical game information is altered according to an embodiment of the present invention.

FIG. 10 is a flow chart of a method 1000 wherein numerical game information is altered according to an embodiment of the present invention. Such a method may be used, for example, to facilitate play of a game in which a player must evaluate and/or respond to numerical information (e.g., a game in which a player must provide appropriate input parameters based on a numerical wind velocity display). At 1002, the numerical game information is determined.

At 1004, the numerical game information is altered by rounding the information (e.g., by altering "4.56" to "4.6"). At 1006, the numerical game information is altered by truncating the information (e.g., by altering "4.56" to "4.5"). At 1008, the numerical game information is altered by averaging the information. At 1010, the numerical game information is altered by adjusting the information (e.g., by altering "4.56" to "4.57).

The altered numerical game information may then be transmitted to a remote player device 300 at 1012. A player may then play a game based on his or her perception of the altered numerical game information.

According to an embodiment of the present invention, each of the alterations to the numerical game information may alter game play by an automated game playing device 360. Moreover, the game play of the automated game playing device 360 may be altered more than game play by a human player.

Note that not all of the alterations shown in FIG. 10 need to be performed. Moreover, other alterations may be performed instead of, or in addition to, those shown in FIG. 10. For example, portions of the numerical game information may be altered by translating the information into a numerical range (e.g., by translating "4.56" to "between 4 and 5"). Similarly, the numerical game information may be altered via a noise adjustment and/or a database of altered values (e.g., a database indicating that "4.56" should always be translated into "between 3 and 6").

Figure 11:
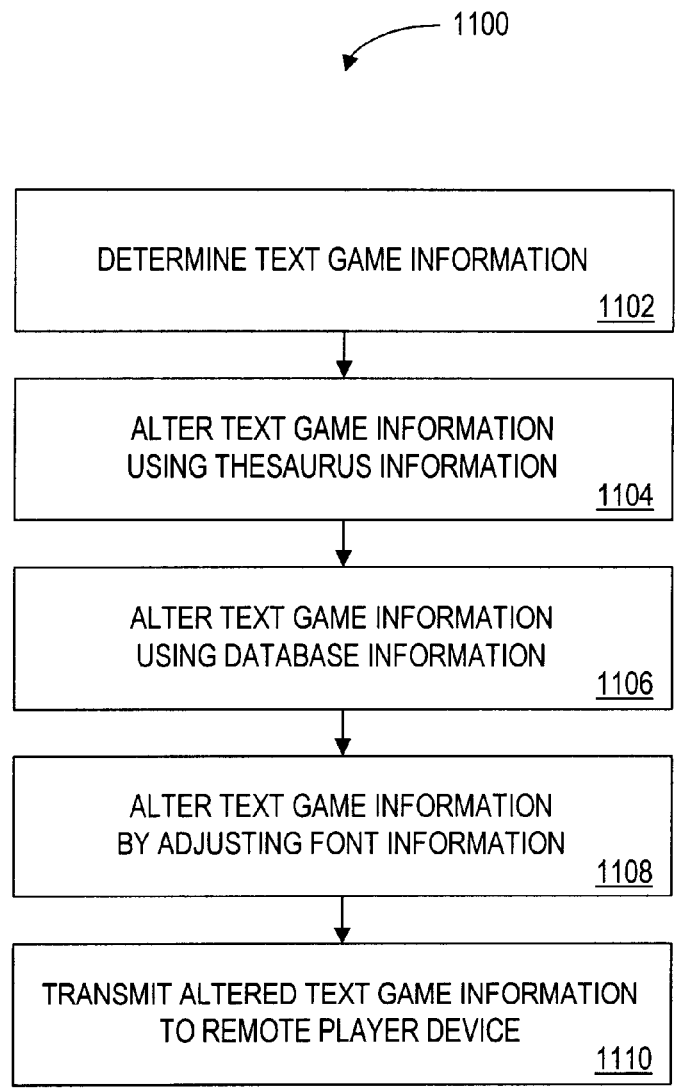
FIG. 11 is a flow chart of a method wherein text game information is altered according to an embodiment of the present invention.

FIG. 11 is a flow chart of a method 1100 wherein text game information is altered according to an embodiment of the present invention. Such a method may be used, for example, to facilitate play of a game in which a player is to answer one or more trivia questions. At 1102, text game information is determined. The text game information may represent, for example, a game question or a set of potential game answers.

At 1104, the text game information is altered using thesaurus information (e.g., by substituting one or more words in a game question). At 1106, the text game information is altered using database information (e.g., a database containing syntax information). At 1108, the text game information is altered by adjusting font information.

The altered text game information may then be transmitted to a remote player device 300 at 1110. A player may then play a game based on his or her perception of the altered text game information. According to an embodiment of the present invention, each of the alterations to the text game information may alter game play by an automated game playing device 360. Moreover, the game play of the automated game playing device 360 may be altered more than game play by a human player.

Note that not all of the alterations shown in FIG. 11 need to be performed. Moreover, other alterations may be performed instead of, or in addition to, those shown in FIG. 11. For example, portions of the text game information may be altered using information stored in an electronic dictionary.

Figure 12:
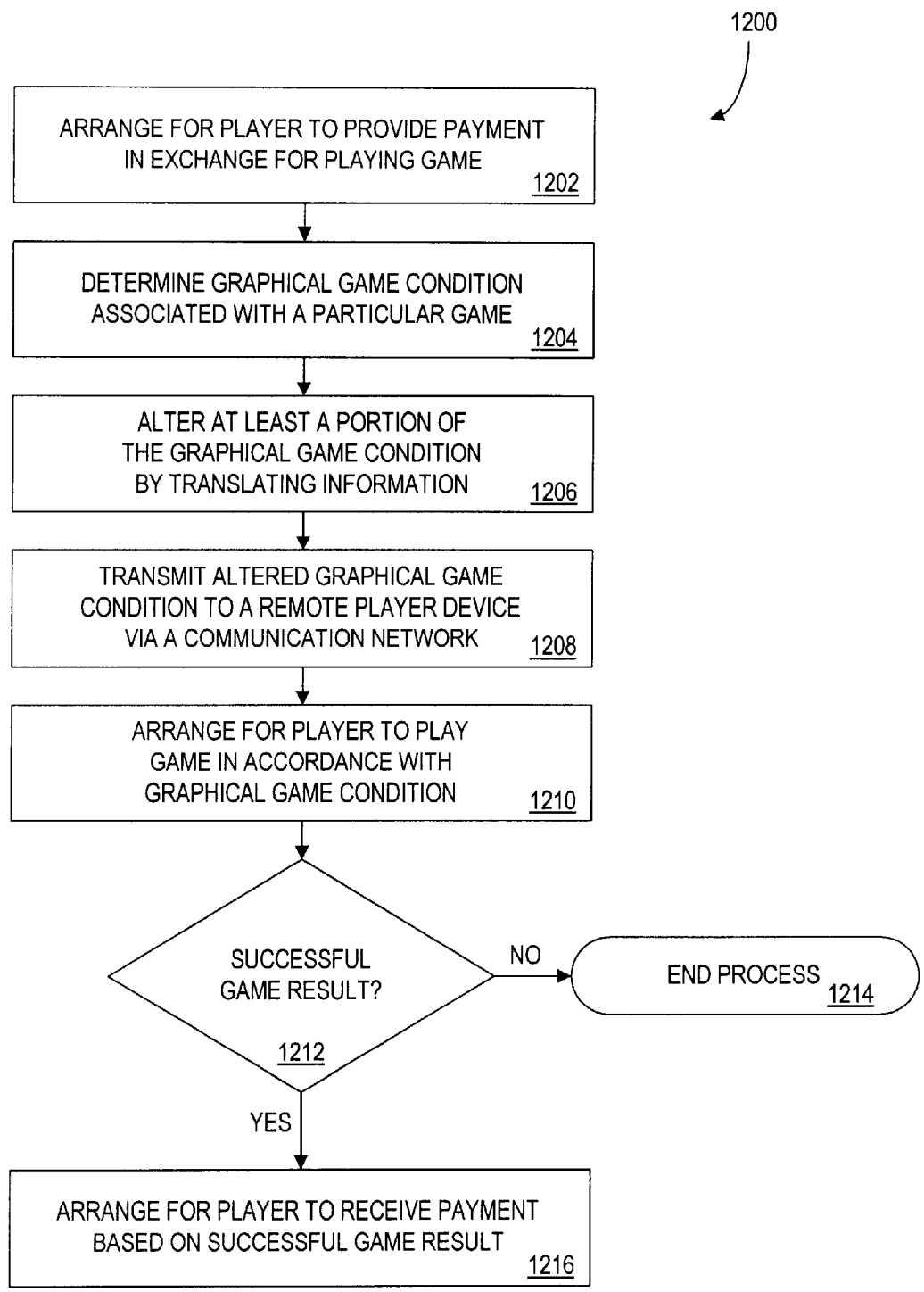
FIG. 12 is a flow chart of a method for facilitating game play according to another embodiment of the present invention.

FIG. 12 is a flow chart of a method 1200 for facilitating game play according to another embodiment of the present invention. At 1202, it is arranged for a player to provide a payment in exchange for playing a game. For example, the game controller 400 may transmit payment information 508 stored in the player database 500 to the payment device 210 to arrange for the player to provide a $5 payment in exchange for twenty game plays.

At 1204, the game controller 400 establishes a graphical game condition. For example, consider the computer-based golf game display 220 shown in FIG. 2B. In this case, the game condition may comprise the three-dimensional putting green terrain 224A that is used to determine how a simulated golf ball will roll. Other game conditions may include, for example, an initial location 222A of a simulated golf ball and/or a simulated golf hole 223A.

Note that the game condition may be established, for example, on a game-by-game basis (e.g., a new putting green terrain 224A may be generated for each game). According to another embodiment, the game condition is established and used for a plurality of different games.

Referring again to FIG. 12, at 1206 at least a portion of the graphical game condition is altered by translating the information (e.g., by translating the information into another graphical image) and the altered graphical game condition is transmitted to a remote player device 300 via a communication network at 1208.

At 1210, it is arranged for the player to play the game in accordance with the graphical game condition. That is, although the player will view and respond to the altered graphical game condition, the game controller 400 will arrange for the game to be played in accordance with the graphical game condition (i.e., and not the altered graphical game condition).

Consider a physics simulation that generates a game result based on (i.e., based at least in past on) the graphical game condition and one or more player input parameters. The player input parameters may be received, for example, from a remote player device 300 when the player uses a computer mouse to position a pointer on a display and clicks a button on the computer mouse to generate a signal associated with the pointer location.

In this case, the physics simulation (e.g., a computer program) may calculate a trajectory of a simulated golf ball in accordance with one or more graphical game conditions (e.g., a fairway layout, a three-dimensional putting green terrain, and/or a wind direction and wind velocity) and the player input parameters (e.g., a golf club type, a golf club velocity, and an angular measurement associated with a swing of a golf club). Based on the calculated trajectory, the game result can then be determined (e.g., a final destination of a simulated golf ball and/or whether or not the simulated golf ball came to rest within a simulated golf hole). Note that the physics simulation may not be a "perfect" simulation of the real world. For example, one or more real-world parameters (e.g., wind resistance) may be ignored or approximated by the physics simulation.

If the game result is not successful at 1212, the process ends at 1214. If the game result is successful at 1212, the game controller 400 arranges for the player to receive a benefit or prize (e.g., a payment of a prize amount) based on the successful game result at 1216. In either case, an indication of the game result may be transmitted from the game controller 400 to the remote player device 300 via a communication network.

For example, the game may use a physics model associated with propelling a simulated object, and a successful game result may comprise the simulated object reaching a predetermined destination or goal location. One example of such a game is a computer-based golf game (e.g., a golf driving simulation or a golf putting simulation) in which a player attempts to propel a simulated golf ball such that it comes to rest within a simulated golf hole. Other types of games that may involve a physics simulation include, for example, a moving water game (e.g., a white-water rafting game), a racing game, a fishing game, a baseball game, a basketball game, a football game, a soccer game, a hockey game, a bowling game, a billiards game, a throwing game (e.g., a dart throwing game), and a shooting game. Note that the game does not need to be a sports game. For example, a ring-toss game, a skee-ball game, a pinball game, an aircraft simulation, or a space-based game (e.g., in which a player maneuvers a spacecraft) can be associated with a physics simulation. A game in which a player attempts to "catch" a simulated object (e.g., by catching a baseball) can also be associated with a physics simulation.

Other types of games that may be facilitated according to embodiments of the present invention include memory games, knowledge games, reaction games, and strategy games.

Additional Embodiments

The following illustrates various additional embodiments of the present invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although most of the embodiments described herein are associated with a game controller 400 determining or altering game information, either of these functions may instead be performed by a player device 300.

Similarly, although most of the embodiments described herein are associated with a game played by a single player, the present invention can also be used with respect to a game involving multiple players. For example, the first player to shoot a hole-in-one may receive payment of a prize amount. In addition, embodiments of the present invention may or may not involve players who provide payments in exchange for playing the game (e.g., a sweepstakes-type prize may be awarded to a player).

Many of the embodiments described herein are associated with a physics simulation in which a simulated object is propelled through space. According to other embodiments, the physics simulation may instead involve, for example, time or temperature. Similarly, other embodiments may be directed to other types of computer-based simulations (e.g., simulations of an urban environment or a financial market). Moreover, embodiments of the present invention may involve pure games of skill, pure games of chance, and/or games associated with both skill and chance.

In another embodiment of the present invention, the altered game information comprises a subset of the game information. That is, a portion of the game information may be not be indicated to the player.

In another embodiment of the present invention, the relationship between the game information and the altered game information is associated with a particular game to be played by a player. For example, visual game information may be shifted one pixel to the left in one game and two pixels to the right in another game.

Instead of altering the game information that is indicated to a player, the game controller 400 may alter one or more player input parameters received from the player. For example, the game controller may alter player input parameters associated with: a golf ball velocity, a golf ball angular measurement, a golf ball rotation, a golf ball location, a golf club velocity, a golf club angular measurement, a golf club location, a golf club type, an aiming direction, and/or an aiming location. In this case, the altered player input parameter may alter game play by an automated game playing device 360 more than game play by a human player.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method of facilitating game play, comprising:

determining first game information associated with a game to be played by a player;

arranging for altered game information to be indicated to the player; and arranging, without enabling the player to determine the first game information, for the player to play the game in accordance with the first game information, the first game information being different from the altered game information, wherein the altered game information alters game play by an automated game playing device more than game play by a human player.

2. The method of claim 1, wherein the player plays the game at a remote player device in communication with a game controller, and said arranging comprises:

transmitting the altered game information from the game controller to the remote player device such that the first game information cannot be determined from the transmitted information.

3. The method of claim 1, wherein the first game information comprises visual information and said arranging comprises:

altering at least a portion of the visual information via at least one of: (i) a location adjustment, (ii) a size adjustment, (iii) a rotation adjustment, (iv) a view adjustment, (vi) a resolution, (vii) an averaging, (viii) a smoothing, (ix) a blurring, (x) a translation, (xi) a noise adjustment, (xii) a color adjustment, (xiii) a brightness adjustment, (xiv) a texture adjustment, and (xv) a visual range.

4. The method of claim 3, wherein the visual information is associated with at least one of: (i) a static image, (ii) a changing image, (iii) a two-dimensional image, and (iv) a three-dimensional image.

5. The method of claim 1, wherein the first game information comprises audio information and said arranging comprises:

altering at least a portion of the audio information via at least one of: (i) a volume adjustment, (ii) a pitch adjustment, (iii) a tone adjustment, (iv) a speed adjustment, (v) an accent adjustment, (vi) a smoothing, (vii) a noise adjustment, and (viii) an audio range.

6. The method of claim 5, wherein the audio information is associated with at least one of: (i) a song, (ii) speech, and (iii) a sound effect.

7. The method of claim 1, wherein the first game information comprises timing information and said arranging comprises:

altering at least a portion of the timing information via at least one of: (i) a periodic adjustment, (ii) a random adjustment, (iii) a noise adjustment, and (iv) a timing range.

8. The method of claim 1, wherein the first game information comprises numerical information and said arranging comprises:

altering at least a portion of the numerical information via at least one of: (i) a numerical adjustment, (ii) a truncation, (iii) a rounding, (iv) an averaging, (v) a noise adjustment, (vi) a database, and (vii) a numerical range.

9. The method of claim 1, wherein the first game information comprises text information and said arranging comprises:

altering at least a portion of the text information via at least one of: (i) a thesaurus, (ii) a dictionary, (iii) a database, (iv) a text adjustment, and (v) a font adjustment.

10. The method of claim 9, wherein the text information is associated with at least one of: (i) a game question, and (ii) a set of potential game answers.

11. The method of claim 1, wherein said arranging comprises:

arranging for at least a portion of the first game information to not be indicated to the player.

12. The method of claim 1, wherein the first game information is associated with a particular game to be played by the player.

13. The method of claim 1, wherein a relationship between the first game information and the altered game information is associated with a particular game to be played by the player.

14. The method of claim 1, wherein said arranging for the player to pay the game comprises:

receiving from a remote player device a set of player input parameters via a communication network; and determining a game result based on the received player input parameters and the first game information.

15. The method of claim 14, wherein said arranging for the player to play the game further comprises:

transmitting to the remote player device an indication associated with the game result.

16. The method of claim 14, wherein the remote player device comprises at least one of: (i) a personal computer, (ii) a portable computing device, (iii) a personal digital assistant, (iv) a wireless telephone, and (v) a game terminal.

17. The method of claim 14, wherein the communication network comprises at least one of: (i) a publicly-accessible computer network, (ii) a public network, (iii) a public switched telephone network, (iv) a proprietary network, (v) a cable television network, (vi) a wireless network, and (vii) a local area network.

18. The method of claim 14, further comprising:

arranging for the player to receive a payment if the determined game result has a predetermined relationship to a successful game result.

19. The method of claim 14, further comprising:

arranging for the player to provide a payment in exchange for playing the game.

20. The method of claim 1, wherein the game is associated with a physics simulation, the physics simulation being adapted to generate a game result based on the first game information and a set of input parameters, and said arranging for the player to play the game comprises:

receiving from a remote player device a set of player input parameters via a communication network; and determining a game result based on the received player input parameters, the first game information, and the physics simulation.

21. The method of claim 20, wherein the game is associated with propelling a simulated object, and a successful game result comprises the simulated object reaching a predetermined destination.

22. The method of claim 20, wherein the game comprises a golf simulation, and a successful game result comprises information associated with at least one of:

a distance between a golf ball and a golf hole, whether the golf ball comes to rest within the golf hole, and a number of strokes required to place the golf ball within the golf hole.

23. The method of claim 20, wherein the game comprises a golf simulation, and the first game information is associated with at least one of:

a terrain feature, a terrain contour, a three-dimensional putting green terrain, a fairway layout, a fairway contour, a wind direction, a wind velocity, a friction parameter, a golf ball location, and a golf hole location.

24. The method of claim 20, wherein the game is associated with at least one of:

a golf simulation, a golf putting simulation, a gold driving simulation, an archery simulation, a moving water simulation, a racing simulation, a fishing simulation, a baseball simulation, a basketball simulation, a football simulation, a soccer simulation, a hockey simulation, a bowling simulation, a billiards simulation, a throwing simulation, a ring-toss simulation, a shooting simulation, and a space simulation.

25. The method of claim 20, wherein the game is associated with at least one of:

a memory game, a knowledge game, a reaction game, and a strategy game.

26. The method of claim 20, wherein the game is associated with at least one of:

an archery simulation, a moving water simulation, a racing simulation, a fishing simulation, a baseball simulation, a basketball simulation, a football simulation, a soccer simulation, a hockey simulation, a bowling simulation, a billiards simulation, a throwing simulation, a ring-toss simulation, a shooting simulation, and a space simulation.

27. The method of claim 20, wherein the game is associated with at least one of:

a memory game, a knowledge game, and a reaction game.

28. The method of claim 1, further comprising:

storing information enabling the determination of the first game information and the altered game information.

29. An apparatus, comprising:

a processor; and a storage device in communication with said processor and storing instructions adapted to be executed by said processor to:

determine first game information associated with a game to be played by a player;

arrange for altered game information to be indicated to the player; and arrange, without enabling the player to determine the first game information, for the player to play the game in accordance with the first game information, the first game information being different from the altered game information, wherein the altered game information alters game play by an automated game playing device more than game play by a human player.

30. The apparatus of claim 29, wherein said storage device further stores at least one of: (i) a player database; and (ii) a game database.

31. The apparatus of claim 29, further comprising:

a communication device coupled to said processor and adapted to communicate with at least one of: (i) a player device, (ii) a game controller, (iii) a payment device, and (iv) an automated game playing device.

32. The apparatus of claim 29, further comprising:

a communication device coupled to said processor and adapted to communicate with a payment device.

33. A medium storing instructions adapted to be executed by a processor to perform a method of facilitating game play, said method comprising:

determining first game information associated with a game to be played by a player;

arranging for altered game information to be indicated to the player; and arranging, without enabling the player to determine the first game information, for the player to play the game in accordance with the first game information, the first game information being different from the altered game information, wherein the altered game information alters game play by an automated game playing device more than game play by a human player.

34. A computer-implemented method of conducting a golf game associated with a golf simulation, the golf simulation being adapted to generate a game result based on a set of input parameters, comprising:

arranging for a player to provide a payment in exchange for playing the golf game;

establishing a first golf game condition;

transmitting an altered golf game condition to a remote player device via a communication network, the altered golf game condition being different from the first golf game condition;

receiving from the remote player device a set of player input parameters via the communication network, the set of player input parameters being based on the altered golf game condition;

determining a game result based on the received player input parameters, the first golf game condition, and the golf simulation, wherein the golf game is associated with hitting a simulated golf ball and the game result comprises the simulated golf ball reaching a destination;

transmitting to the remote player device an indication associated with the game result via the communication network; and arranging for the player to receive a payment if the destination of the simulated golf ball is within a predetermined distance of a simulated golf hole.

35. A method of facilitating game play, comprising:

determining first game information;

altering the first game information; and arranging, without enabling the player to determine the first game information, for the altered game information to be indicated to the player, wherein the altered game information alters game play by an automated game playing device more than game play by a human player.

36. A method of facilitating game play, comprising:

receiving from a player a player input parameter generated by at least one of a keyboard and a pointing device;

determining, without an instruction from the player to do so, an altered player input parameter by altering the player input parameter generated by the at least one of a keyboard and a pointing device; and arranging for the player to play a game based on the altered player input parameter, wherein the altering of the player input parameter is performed so as to alter game play by an automated game playing device more than game play by a human player.

37. The method of claim 36, wherein the game comprises a golf simulation, and the player input parameter includes information associated with at least one of:

a golf ball velocity, a golf ball angular measurement, a golf ball rotation, a golf ball location, a golf club velocity, a golf club angular measurement, a golf club location, a golf club type, an aiming direction, and an aiming location.

38. A method of facilitating game play, comprising:

translating a first game condition into a translated game condition;

arranging for the translated game condition to be provided to a player; and arranging, without enabling the player to determine the first game condition, for the player to play the game in accordance with the first game condition, the first game condition being different from the translated game condition, wherein the translated game condition alters game play by an automated game playing device more than game play by a human player.

39. A method of playing a game, comprising:

receiving an indication of an altered game condition; and playing the game in accordance with a first game condition that is different from the altered game condition and affects a simulated movement of a simulated object, without being able to determine the first game condition, wherein the altered game condition alters game play by an automated game playing device more than game play by a human player.

40. The method of claim 39, wherein the first game condition is one of a fairway layout, a three-dimensional putting green and wind condition.

41. A method of facilitating game play, comprising:

determining first game information associated with a game to be played by a player;

generating altered game information by altering the first game information;

arranging for the altered game information to be indicated to the player; and arranging for the player to play the game in accordance with the first game information;

wherein the altered game information is configured to reduce accuracy of performance of an automated game playing device without altering performance of a human player.

42. A method comprising:

displaying altered game information to a player of a game; and while the altered game information is being displayed, playing the game in accordance with first game information that is different from the displayed altered game information, whereby the altered game information and the first game information are both associated with the game being played by the player.

* * * * *